United States Patent [19]

Teramura

[11] Patent Number: 5,364,213
[45] Date of Patent: Nov. 15, 1994

[54] CAP FOR FASTENING DEVICES FOR MOTOR VEHICLE WHEELS AND THE LIKE

[75] Inventor: Koji Teramura, Osaka, Japan

[73] Assignee: Kyo-Fi Industrial Corporation, Osaka, Japan

[21] Appl. No.: 140,492

[22] Filed: Oct. 25, 1993

[30] Foreign Application Priority Data

Oct. 27, 1992 [JP] Japan .................. 4-074757

[51] Int. Cl.⁵ .................. F16B 37/14
[52] U.S. Cl. .................. 411/431; 411/377; 411/374; 411/910; 70/232
[58] Field of Search .......... 411/377, 431, 374, 373, 411/372, 429, 910; 70/232, 229

[56] References Cited

U.S. PATENT DOCUMENTS

| | | | |
|---|---|---|---|
| 1,298,397 | 3/1919 | Purple | 411/910 |
| 3,052,942 | 9/1962 | Mulvaney | |
| 3,241,408 | 3/1966 | McCauley | 411/910 |
| 3,482,481 | 12/1969 | Newell et al. | |
| 4,659,273 | 4/1987 | Dudley | |
| 4,880,344 | 11/1989 | Henry | 411/429 |
| 4,884,933 | 12/1989 | Preusker | 411/374 |
| 5,104,274 | 4/1992 | Omori | 411/429 |

FOREIGN PATENT DOCUMENTS

| | | | |
|---|---|---|---|
| 2531155 | 2/1984 | France | 411/431 |
| 0214623 | 3/1987 | Germany | |

Primary Examiner—Flemming Saether
Attorney, Agent, or Firm—Armstrong, Westerman, Hattori, McLeland & Naughton

[57] ABSTRACT

A cap for fastening devices comprises an inner cap member fittable over a hexagonal engageable portion of the fastening device and having a top wall centrally formed with a threaded bore, an outer cap member fittable over the inner cap member and having a bolt hole formed in a top wall thereof and corresponding to the threaded bore in position, and a bolt to be screwed into the bore through the bolt hole. The inner cap member has a peripheral wall formed with six deformation promoting slits extending longitudinally thereof. The outer surface rear end portion of the peripheral wall has projecting tapered portions for inwardly moving the rear end portion of the inner cap member when the outer cap member is slidingly moved relative to the inner cap member by rotating the bolt relative to the inner cap member in a screwing-in direction.

19 Claims, 6 Drawing Sheets

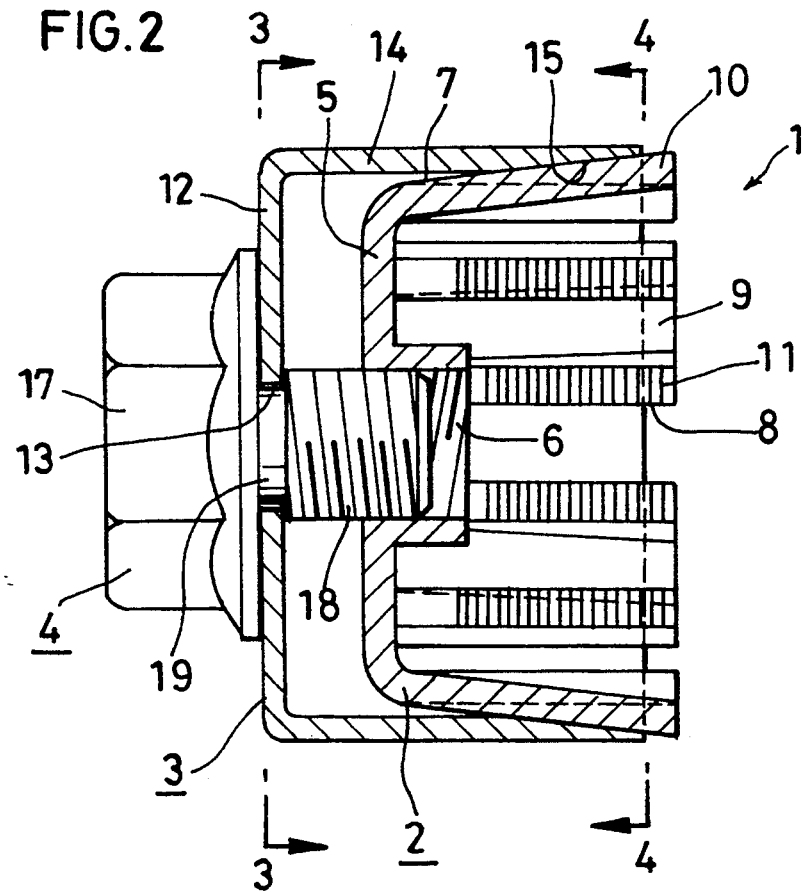
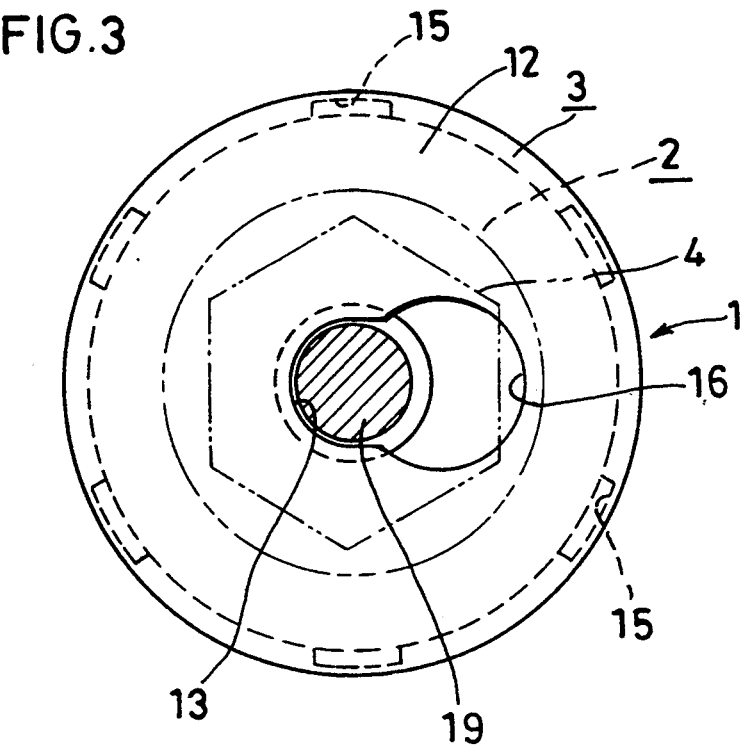

CAP FOR FASTENING DEVICES FOR MOTOR VEHICLE WHEELS AND THE LIKE

BACKGROUND OF THE INVENTION

The present invention relates to a cap for fastening devices which is useful for motor vehicle wheels, studded devices on wheels, butteries, roof lamps of four-wheel drive vehicles and like parts for preventing a third person from stealing such a part by loosening bolts or nuts fastening the part without permission or for attaching the studded device to the wheel.

FIG. 9 shows a cap 60 for fastening devices which is already known. With reference to FIG. 9, the cap comprises a cap body 61 generally in the form of a hollow cylinder for covering a polygonal engageable portion of a wheel attaching nut A. The top wall 61a of the cap body 61 has a through hole 62 close to a peripheral portion thereof. A pressure piece 65 for preventing the cap from slipping off has an outer slanting face 64 and is disposed inside an inner slanting face 63 internally provided on the cap. A pressure piece sliding screw 66 inserted through the hole 62 has an end portion screwed into a threaded bore in the pressure piece 65. A spring 69 is provided around the screw 66. The head 67 of the screw 66 is formed in its front surface with an engagement cavity 68 of specified shape. When rotated relative to the pressure piece 65 in the screwing-in direction, the screw 66 slidingly moves the outer slanting face 64 on the inner slanting face 63, moving the pressure piece 65 also radially inward simultaneously with the axial movement and thereby pressing the pressure piece 65 against the nut A with a great force, whereby the cap 60 is prevented from slipping off the nut A.

The conventional cap 60 has the advantage of being usable for fastening devices of any type, but since the cap body needs to accommodate therein the pressure piece 65 for preventing the cap from slipping off, the cap body has an outwardly projecting side portion corresponding to the pressure piece. In the case where the wheel has a small nut insertion hole in which only a small clearance is available around the nut A, there arises the problem that the projecting portion interferes with the edge of the wheel defining the nut insertion hole to render the cap 60 not fittable to the nut A.

SUMMARY OF THE INVENTION

An object of the present invention is to provide a cap which is usable for fastening devices of any type and which is easily fittable to a nut even when the nut insertion hole of the wheel is small.

The present invention provides a cap for fastening devices which comprises an inner cap member fit-table over a polygonal engageable portion of the fastening device and having a top wall centrally formed with a threaded bore, an outer cap member fittable over the inner cap member and having a bolt hole formed in a top wall thereof and corresponding to the threaded bore in position, and a bolt to be screwed into the threaded bore through the bolt hole, the inner cap member having a peripheral wall formed with at least one deformation promoting slit extending longitudinally of the peripheral wall, at least one of an outer surface rear end portion of the peripheral wall of the inner cap member and an inner surface rear end portion of a peripheral wall of the outer cap member having a projecting tapered portion for inwardly moving the rear end portion of the inner cap member when the outer cap member is slidingly moved relative to the inner cap member by rotating the bolt relative to the inner cap member in a screwing-in direction.

When the bolt is tightened with the cap members fitted over the polygonal engageable portion of the fastening device, the outer cap member is slidingly moved rearward relative to the inner cap member, thereby moving the rear end portion of the inner cap member radially inward, whereby the cap is tightly fitted over the fastening device. Accordingly, the cap is usable for fastening devices of any type and very convenient to use and can be easily fitted over a nut on a wheel even if only a small clearance is available in the nut insertion hole thereof around the nut.

The inner cap member may be formed with six deformation promoting slits at equal spacings.

The outer surface rear end portion of the inner cap member peripheral wall may be formed with six tapered portions at equal spacings.

The outer cap member may be in the form of a hollow cylinder, with six slanting grooves formed in the inner surface rear end portion of the outer cap member peripheral wall, the grooves being inclined to correspond to the tapered portions of the inner cap member peripheral wall.

The inner surface rear end portion of the inner cap member peripheral wall may be knurled for preventing slipping off.

The fastening device can then be firmly held by the cap when the bolt is tightened up with the cap fitted over the fastening device.

The threaded bore of the inner cap member and the bolt hole of the outer cap member may be formed in the respective top walls centrally thereof to position the axis of the threaded bore in coincidence with the axis of the outer cap member.

The cap can then be easily fitted over a nut on a wheel even when the clearance in the nut insertion hole of the wheel around the nut is small.

The bolt hole in the top wall of the outer cap member may be made smaller than the diameter of the threaded portion of the bolt and formed with a large aperture in communication with the bolt hole for inserting the threaded portion of the bolt therethrough, the threaded portion of the bolt being formed at its base end with a shank portion snugly fittable in the bolt hole of the outer cap member.

The outer cap member can then be readily aligned with the threaded bore.

The bolt may have a solid cylindrical head with an engagement cavity of specified shape formed in the front surface of the bolt head.

The cap can then be attached to or removed from the fastening device only with a tool having an engaging projection fittable to the engagement cavity. In the case where the bolt has the engagement cavity of specified shape in the front side of its head, it is only with a tool having an engaging projection fittable in the cavity that the cap can be attached to or removed from the fastening device. This type of cap is therefore suited to use with motor vehicle wheels, studded devices mounted on wheels, batteries, roof lamps on four-wheel drive vehicles and like parts for antitheft purposes.

The bolt head may have a conical front side.

The bolt thus shaped can not be turned with a monkey wrench or pipe wrench even if so attempted on one way or another since the wrench is not engageable with the bolt head. The cap therefore has a more reliable antitheft effect.

The bolt may be a flanged bolt having a head in the form of a hexagonal prism.

The cap can then be attached to or removed from the fastening device with a usual wrench, and is usable, for example, for attaching a studded device to a vehicle wheel.

BRIEF DESCRIPTION OF THE DRAWINGS

FIG. 2 is a view in vertical section the same;

FIG. 3 is a view in section taken along the line III—III in FIG. 2;

DESCRIPTION OF THE PREFERRED EMBODIMENTS

Figure 1:
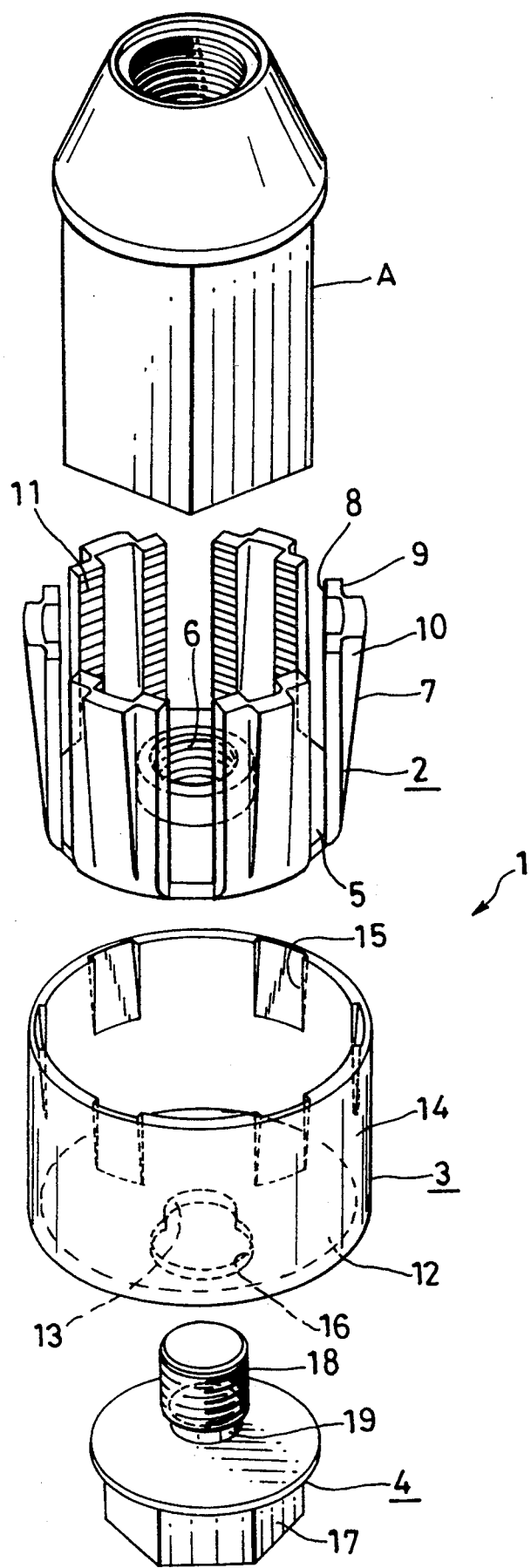
FIG. 1 is an exploded perspective view showing a cap embodying the invention for use with fastening devices.
Figure 4:
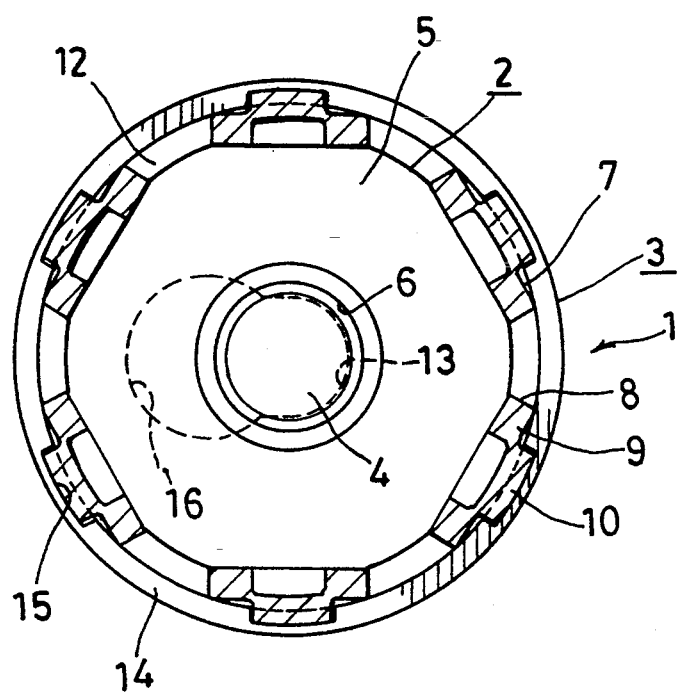
FIG. 4 is a view in section taken along the line IV—IV in FIG. 2.
Figure 9:
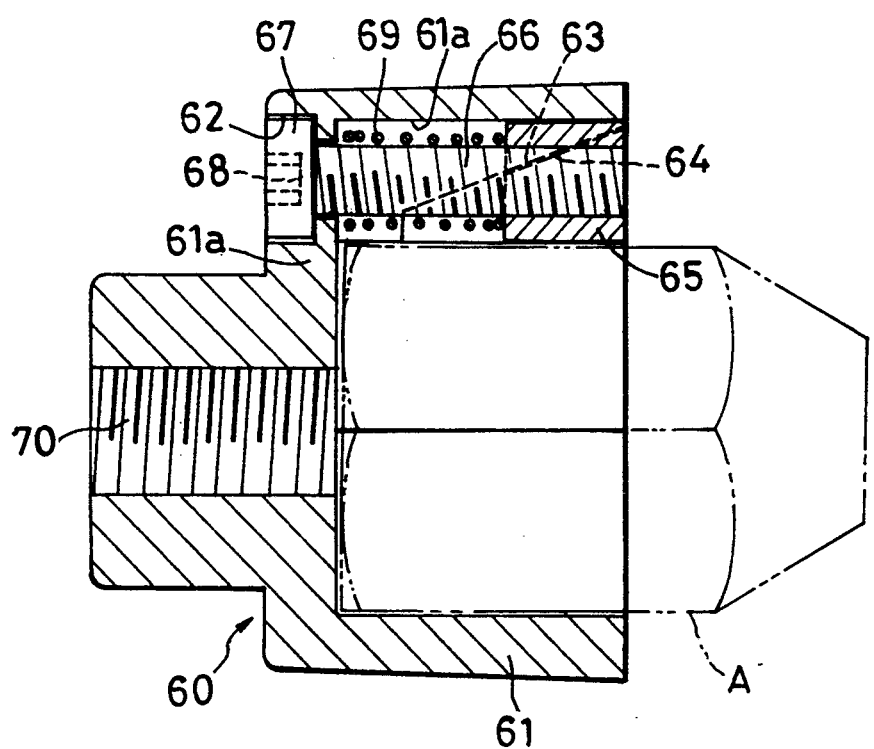
FIG. 9 is a view in vertical section showing a conventional cap for fastening devices.

Embodiments of the invention will be described below with reference to the drawings. The term "front" as used herein refers to the left-hand side of FIG. 2 which is closer to the worker by whom a cap is removed from or attached to a nut, and the term "rear" to the opposite side.

FIGS. 1 to 4 show a cap 1 embodying the invention. The cap 1 comprises an inner cap member 2 of metal resembling a tube of regular hexagonal cross section, fittable over a hexagonal engageable portion of a nut A and having a top wall 5 centrally formed with a threaded bore 6, an outer cap member 3 of metal in the form of a hollow cylinder, fittable over the inner cap member and having a bolt hole 13 formed in a top wall 12 thereof and corresponding to the threaded bore 6 in position, and a bolt 4 to be screwed into the threaded bore 6 through the bolt hole 13.

The peripheral wall 7 of the inner cap member 2 has six deformation promoting slits 8 extending longitudinally of the wall 7 and formed as if by removing the respective ridges of the regular hexagonal tube, whereby six rectangular plate portions 9 are formed which are radially resilient and elongated longitudinally of the wall 7. At the middle of width of each rectangular plate portion 9, this portion 9 extends outward from an intermediate part of its length toward the rear end thereof to provide a tapered portion 10 inclined outward toward the rear. The plate portion 9 is knurled as at 11 over the inner surface for preventing slipping off.

The peripheral wall 14 of the outer cap member 2 has an inner surface rear end portion which is formed with six slanting grooves 15 inclined outward toward the rear and corresponding to the tapered portions 10 of the respective rectangular plate portions 9 of the inner cap member peripheral wall 7. The tapered portions 10 of the inner cap member 2 are fittable in the respective slanting grooves 15. The bolt hole 13 in the top wall 12 of the outer cap member 2 is smaller than the diameter of the threaded portion 18 of the bolt 4. A large aperture 16 is formed in the top wall 12 for inserting the threaded portion 18 of the bolt 4 therethrough and is in communication with the bolt hole 13.

The threaded bore 6 of the inner cap member 2 and the bolt hole 13 of the outer cap member 3 are formed in the respective top walls 5, 12 centrally thereof to position the axis of the threaded bore 6 in coincidence with the axis of the outer cap member 3.

The bolt 4 used in the present embodiment is a flanged bolt having a usual hexagonal head 17. The threaded portion 18 of the bolt 4 is formed at its base end with a shank portion 19 snugly fittable in the bolt hole 13 of the outer cap member 3.

The cap 1 is attached to the nut A in the following manner.

The bolt 4 is first inserted into the outer cap member 3 through the large aperture 16 in its top wall, and is then slidingly fitted into the belt hole 13. The inner cap member 2 is fitted into the outer cap member 3, with the tapered portion 10 of the peripheral wall rectangular plate portions 9 of the inner cap member 2 fitted in the respective slanting grooves 15 of the outer cap member 3. This positions the threaded bore 6 in alignment with the bolt 4. When the bolt 4 is slightly screwed into the bore 6, the inner cap member 2, the outer cap member 3 and, the bolt 4 are assembled. In this state, the rear end of the inner cap member 2 slightly projects beyond the rear end of the outer cap member 3. When the bolt 4 is further screwed in with the inner cap member 2 fitted over the nut A, the outer cap member 3 is slidingly moved rearward relative to the inner cap member 2 to exert a force on the inner cap member 2 inward radially thereof with this movement, whereby the rectangular plate portions 9 of the inner cam member 2 are moved radially inward into tight pressing contact with the nut A.

Figure 5:
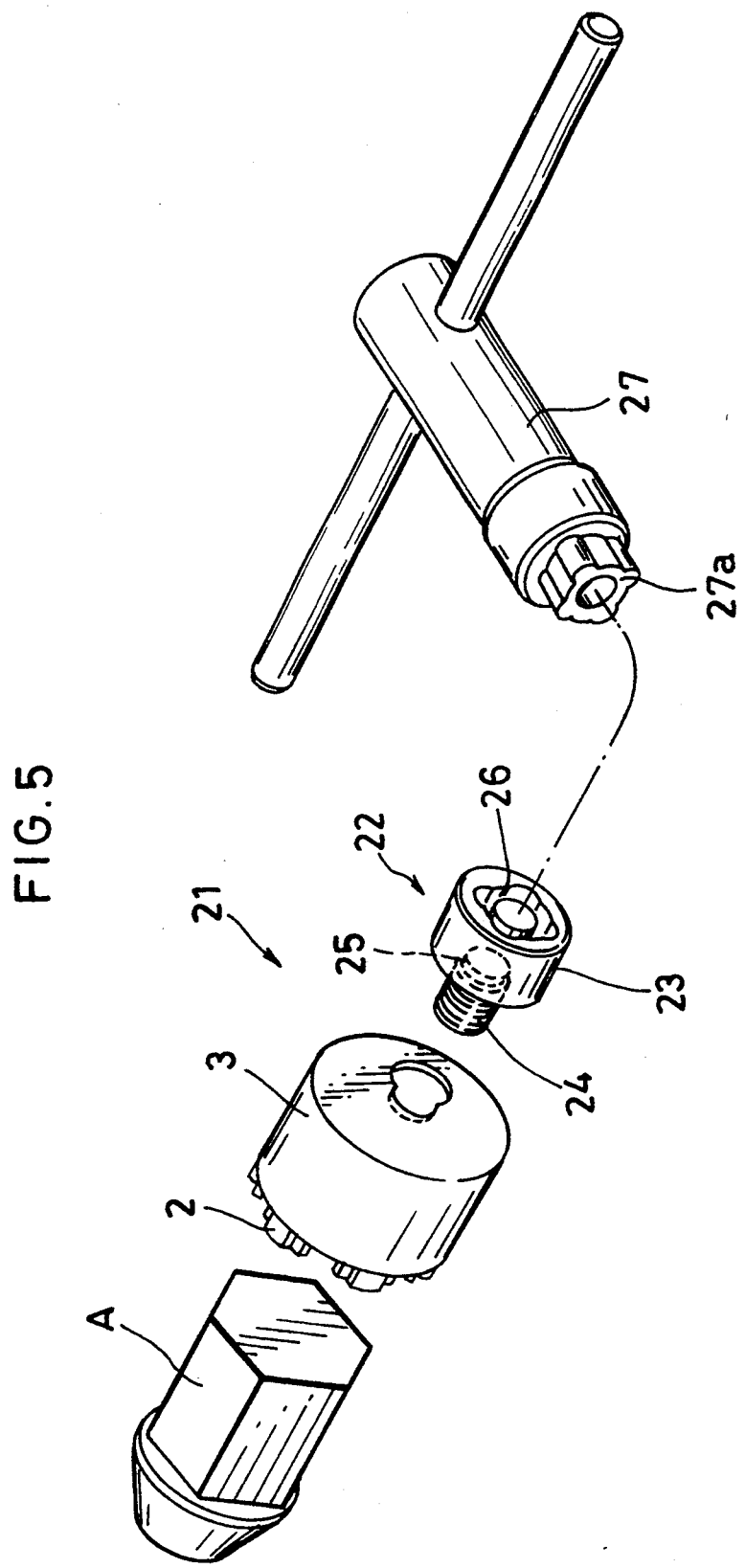
FIG. 5 is a perspective view of a cap embodying the invention for a fastening device for the prevention of theft.

The above embodiment provides a cap 21 for use with fastening devices for antitheft purposes, when the bolt 4 is replaced by other bolt 22. As shown in FIG. 5, the bolt 22 for use in the cap 21 has a head 23 in the form of a short solid cylinder and formed in its outer end face with a cavity 26 of specified shape. As in the foregoing embodiment, the threaded portion 24 of the bolt 22 has at its base end a shank portion 25 snugly fittable in the bolt hole 13 of the outer cap member 3.

In this case, the bolt 22 can be turned only with a special unfastening tool 27 which is formed at its front end with a projection 27a fittable in the cavity 26. Thus, the cap 21 is not removable from the nut A unless the special unfastening tool 27 is available. Accordingly, the motor vehicle wheel can be prevented from being stolen by fitting the cap 21 over the nut A for attaching the wheel and thereafter tightening up the bolt 22 with the tool 27.

Since the threaded bore 6 of the inner cap member 2 and the bolt hole 13 of the outer cap member 3 are formed in the respective top walls 5, 12 centrally thereof to make the threaded bore 6 positionable in alignment with the outer cap member 3, the cap is easily fittable over the nut A even if the clearance in the nut insertion hole of the wheel around the nut A is small.

Similarly, parts other than motor vehicle wheels, such as studded devices mounted on wheels, batteries and roof lamps of four-wheel drive vehicles, can also be protected from thieves by the cap 21 of the invention which has the bolt 22 with the cavity 26 of special shape formed in its head 23 when the cap 21 is fitted over the bolt or nut fastening the part.

Next, a description will be given of the case wherein the cap 21 is used for the studded device on the wheel.

Figure 6:
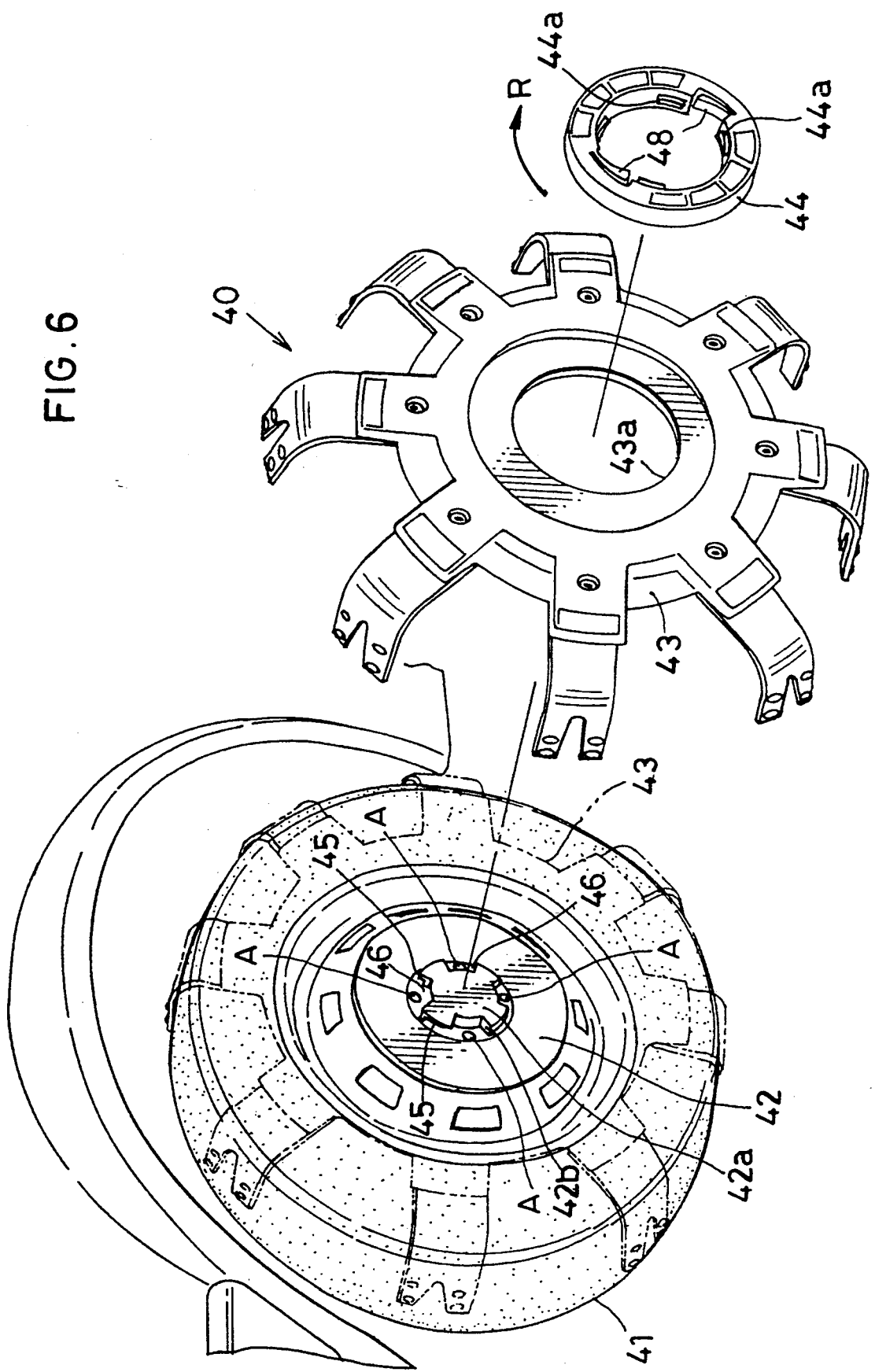
FIG. 6 is an exploded perspective view of a studded device to be attached to a wheel using the cap of the invention.
Figure 7:
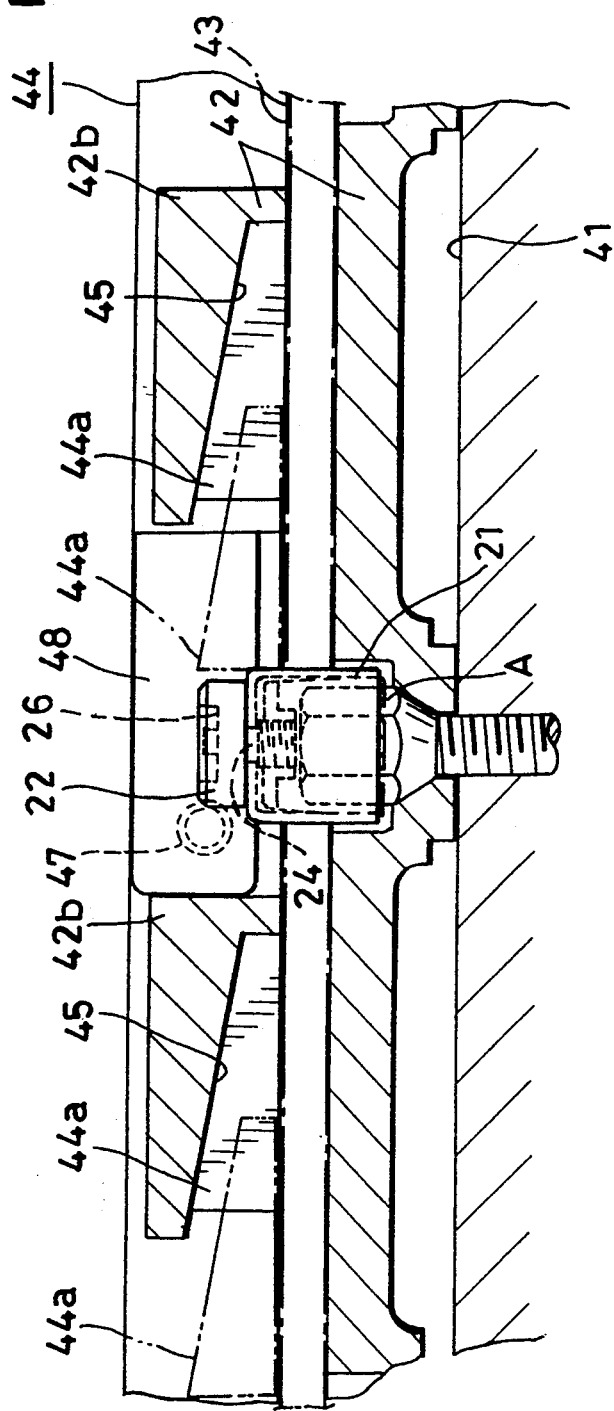
FIG. 7 is an enlarged fragmentary view in section of the cap of the invention as used for preventing theft of the studded device on the wheel.

With reference to FIGS. 6 and 7, a fixed disk 42 having a protuberant portion 42a at its center bears on the central portion of the side face of a vehicle wheel 41 and is fixed to the wheel 41 with a plurality of wheel attaching nuts A. A studded spidery frame 43 having an attaching hole 43a in its center is provided on the fixed disk 42, with the protuberant portion 42a fitting in the hole 43a. The studded frame 43 is provided with a removable member 44 resembling a doughnut, with the protuberant portion 42a of the fixed disk 42 similarly fitting in the removable member 44. The removable member 44 is provided on its inner periphery with a plurality of inner ridges 44a extending circumferentially thereof and arranged at a predetermined spacing, while the protuberant portion 42a of the fixed disk 42 is formed in its outer periphery with a plurality of guide grooved portion 45 arranged at a predetermined spacing circumferentially thereof and conforming to the inner ridges 44a. A cutout is formed between the guide grooved portion 45. The removable member 44 is attached to the fixed disk 42 by the engagement of the inner ridges 44a in the respective guide grooved portions 45. The inner ridges 44a and the guide grooved portions 45 have a width gradually increasing from one end toward the other end so that the removable member 44 is pressed into contact with the fixed disk 42 as the inner ridges 44a are fitted into the grooved portions 45 by rotating the removable member 44 in the direction R in FIG. 6. The removable member 44 has on its inner periphery a pair of pawls 48 biased inward by a spring 47. The pawl 48 is in engagement with an outer projection 42b on the fixed disk 42, preventing the removable member 44 from turning in the disengaging direction opposite to the direction R. Thus, the fixed disk 42, the studded frame 43 and the removable member 44 provide a studded device 40.

The cap 21 comprising the bolt 22 having the cavity 26 of specified shape in its head 23 is fitted, for example, over each of the opposed two of four wheel attaching nuts A fixing the disk 42. Even if it is then attempted to rotate the removable member 44 in the disengaging direction, contact of the inner ridge 44a of the member 44 with the head 23 of the bolt 22 prevents the rotation (see dot-and-dash lines in FIG. 7). Theft of the studded device 40 is prevented because removal of the bolt 22 necessitates the special unfastening tool 27 having at its forward end the projection 27a fittable in the cavity 26 of specified shape.

In the case of the above embodiment, the wheel attaching nut A can be a conventional one, and there is no need to use a specific bolt or nut having a threaded bore 6. When the studded device 40 installed, the flanged bolt 4 having a usual hexagonal head 17 is also usable to prevent the removable member 44 from rotating relative to the vehicle wheel 41 and being removed.

Figure 8:
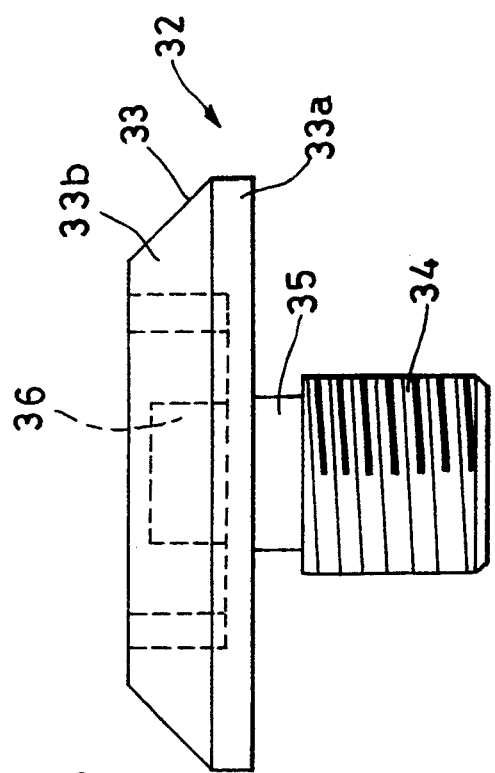
FIG. 8 is a view in vertical section showing a modified bolt in the cap of the invention.

FIG. 8 shows another embodiment of bolt for use in the antitheft cap. The illustrated bolt 32 has a head 33 which comprises a rear solid cylindrical portion 33a and a front frustoconical portion 33b having a cavity 36 of specified shape in its front end face. The cylindrical portion 33a is smaller than the head of the aforementioned bolt 22 in height. As in the foregoing embodiments, the threaded portion 34 of the bolt 32 has at its base end a shank portion 35 snugly fittable in the bolt hole 13 of the outer cap member 3. The bolt 32 can not be turned with a monkey wrench or pipe wrench even if so attempted in one way or another since the wrench is not engageable with the head 33. The cap having the bolt 32 therefore has a more reliable antitheft effect.

Although the deformation promoting slits 8 are six in number in the foregoing embodiments, the number of slits 8 is not limited but is changeable suitably.

What is claimed is:

1. A cap for a fastening device, comprising:
   an inner cap member fittable over a polygonal engageable portion of the fastening device and having a top wall centrally formed with a threaded bore, an outer cap member fittable over the inner cap member and having a bolt hole formed in a top wall thereof and corresponding to the threaded bore, and a bolt to be screwed into the threaded bore through the bolt hole, the inner cap member having a peripheral wall formed with at least one deformation promoting slit extending longitudinally of the peripheral wall, at least one of an outer surface rear end portion of the peripheral wall of the inner cap member and an inner surface rear end portion of a peripheral wall of the outer cap member having a projecting tapered portion for inwardly moving the rear end portion of the inner cap member when the outer cap member is slidingly moved relative to the inner cap member by rotating the bolt relative to the inner cap member in a screwing-in direction;
   and wherein the peripheral wall of the inner cap member has a plurality of radially resilient and separated plate portions which together form the tapered portion, and the outer cap has a hollow center and is formed on an inner rear peripheral surface facing said hollow center with a plurality of slant grooves (15) inclined outward towards the rear end of the cap and each corresponding to a respective one of said plate portions of the tapered portion.

2. A cap as defined in claim 1 wherein the bolt has a solid cylindrical head, and an engagement cavity of specified shape is formed in the front surface of the bolt head.

3. A cap as defined in claim 1 wherein the bolt has a head comprising a rear solid cylindrical portion and a front frustoconical portion formed in its front end face with a cavity of specified shape.

4. A cap as defined in claim 1 wherein the bolt is a flanged bolt having a head in the form of a hexagonal prism.

5. A cap as defined in claim 1 wherein plate portions (9) each have an inclined central portion which extends outward along only an intermediate part of its length to form the tapered portion and each has two knurled sections (11) at opposite sides of the inclined central portion and on an inner side of the inner cap member.

6. A cap member according to claim 5 wherein said inclined central portions each have a width which is narrower than a width of the respective plate portion, the width of each of said inclined central portions being substantially equal to a width of a respective one of said slant grooves so as to be fittable therein only at the inclined central portion.

7. A cap as defined in claim 1 wherein the inner cap member is made of metal and in the form of a tube having a regular hexagonal cross section, and said plate portions are separated by six deformation promoting slits formed by removing ridges of the hexagonal tube.

8. A cap as defined in claim 7 wherein the bolt has a solid cylindrical head, and an engagement cavity of specified shape is formed in the front surface of the bolt head.

9. A cap as defined in claim 7 wherein the bolt has a head comprising a rear solid cylindrical portion and a front frustoconical portion formed in its front end face with a cavity of specified shape.

10. A cap as defined in claim 7 wherein the bolt is a flanged bolt having a head in the form of a hexagonal prism.

11. A cap as defined in claim 7 wherein the plurality of radially resilient and separated plate portions which together form the tapered portion form the tapered portion on outer surface rear end portion of the peripheral wall of the inner cap member.

12. A cap as defined in claim 11 wherein the plate portions of said peripheral wall of the inner cap member are rectangular plate portions, and the outer cap member is made of metal, in the form of a hollow cylinder and said slanting grooves consists of six slanting grooves inclined outward toward the rear and corresponding to the respective rectangular plate tapered portions.

13. A cap as defined in claim 12 wherein the peripheral wall inner surface of the inner cap member is knurled for preventing slipping off.

14. A cap as defined in claim 12 wherein the threaded bore of the inner cap member and the bolt hole of the outer cap member are formed in the respective top walls centrally thereof, and the axis of the threaded bore is positionable in coincidence with the axis of the outer cap member.

15. A cap as defined in claim 14 wherein the bolt hole in the top wall of the outer cap member is smaller than the diameter of the threaded portion of the bolt and provided with a large aperture in communication with the bolt hole for the bolt threaded portion to pass through, the threaded portion of the bolt being formed at its base end with a shank portion snugly fittable in the bolt hole of the outer cap member.

16. A cap for a fastening device, comprising:
an inner cap member fittable over a polygonal engageable portion of the fastening device and having a top wall centrally formed with a threaded bore, an outer cap member fittable over the inner cap member and having a bolt hole formed in a top wall thereof and corresponding to the threaded bore, and a bolt to be screwed into the threaded bore through the bolt hole, the inner cap member having a peripheral wall formed with at least one deformation promoting slit extending longitudinally of the peripheral wall, at least one of an outer surface rear end portion of the peripheral wall of the inner cap member and an inner surface rear end portion of a peripheral wall of the outer cap member having a projecting tapered portion for inwardly moving the rear end portion of the inner cap member when the outer cap member is slidingly moved relative to the inner cap member by rotating the bolt relative to the inner cap member in a screwing-in direction;

the inner cap member is made of metal and in the form of a tube having a regular hexagonal cross section, and has six deformation promoting slits formed by removing ridges of the hexagonal tube;

the peripheral wall of the inner cap member has rectangular plate portions each providing the tapered portion, and the outer cap member is made of metal, in the form of a hollow cylinder and formed in the inner surface rear end portion of its peripheral wall with six slanting grooves inclined outward toward the rear and corresponding to the respective rectangular plate tapered portions;

the threaded bore of the inner cap member and the bolt hole of the outer cap member are formed in the respective top walls centrally thereof, and the axis of the threaded bore is positionable in coincidence with the axis of the outer cap member; and the bolt hole in the top wall of the outer cap member is smaller than the diameter of the threaded portion of the bolt and provided with a large aperture in communication with the bolt hole for the bolt threaded portion to pass through, the threaded portion of the bolt being formed at its base end with a shank portion snugly fittable in the bolt hole of the outer cap member.

17. A cap as defined in claim 16 wherein the bolt has a solid cylindrical head, and an engagement cavity of specified shape is formed in the front surface of the bolt head.

18. A cap as defined in claim 16 wherein the bolt has a head comprising a rear solid cylindrical portion and a front frustoconical portion formed in its front end face with a cavity of specified shape.

19. A cap as defined in claim 16 wherein the bolt is a flanged bolt having a head in the form of a hexagonal prism.

* * * * *

UNITED STATES PATENT AND TRADEMARK OFFICE
CERTIFICATE OF CORRECTION

PATENT NO.:   5,364,213
DATED     :   November 15, 1994
INVENTOR(S): Koji TERAMURA It is certified that error appears in the above-identified patent and that said Letters Patent is hereby corrected as shown below:

On the cover page, Item [73], "kyo-Fi Industrial Corporation" should be --Kyo-Ei Industrial Corporation--.

Signed and Sealed this

Eleventh Day of April, 1995

Attest:

BRUCE LEHMAN

Attesting Officer   Commissioner of Patents and Trademarks